Aug. 22, 1950     E. J. DUQUETTE     2,519,748
AUTOMATIC SAW SHARPENING MACHINE

Filed Sept. 26, 1949     4 Sheets-Sheet 2

Edward J. Duquette
INVENTOR.

BY *Clarence A. O'Brien*
*and Harvey B. Jacobson*
Attorneys

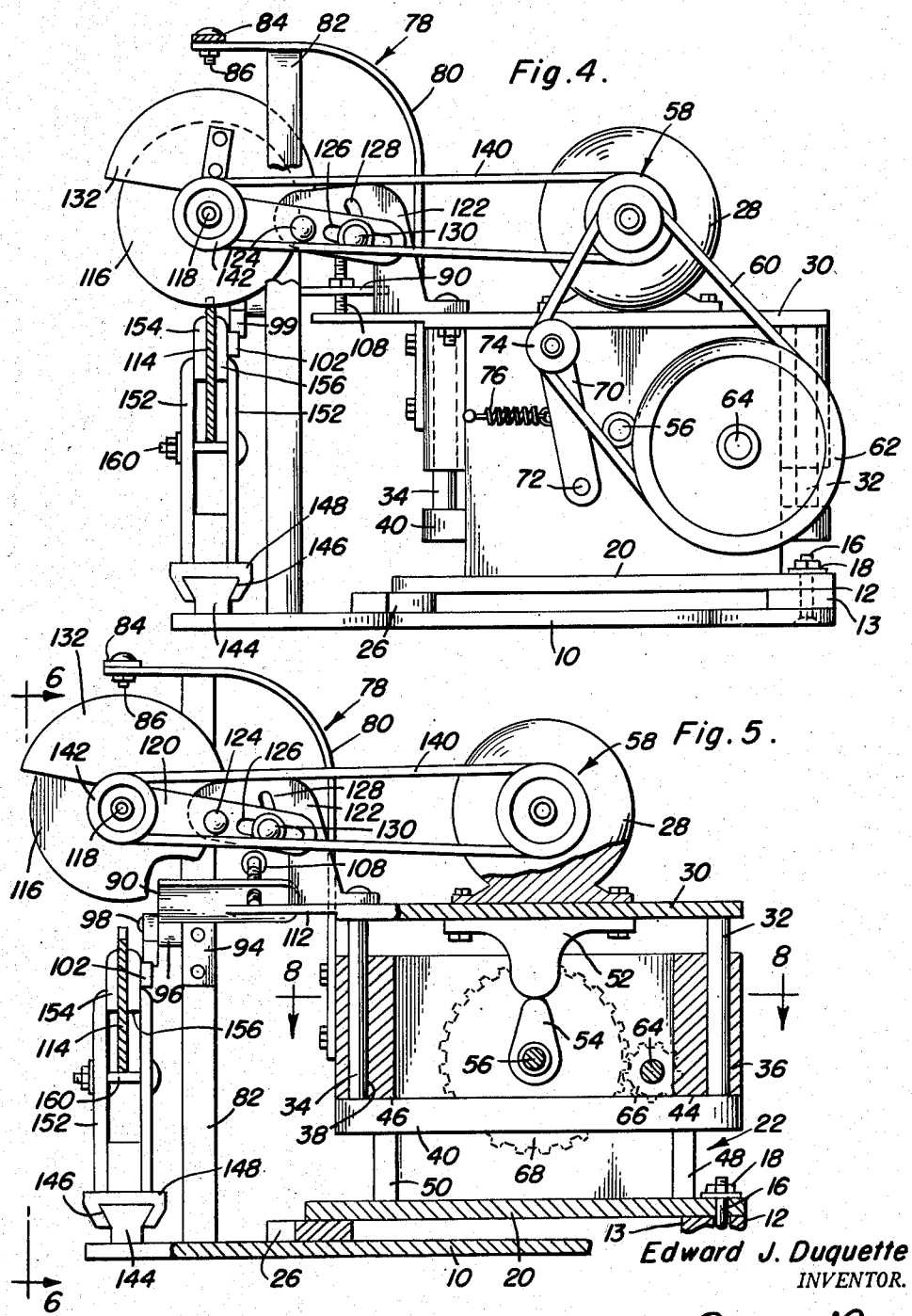

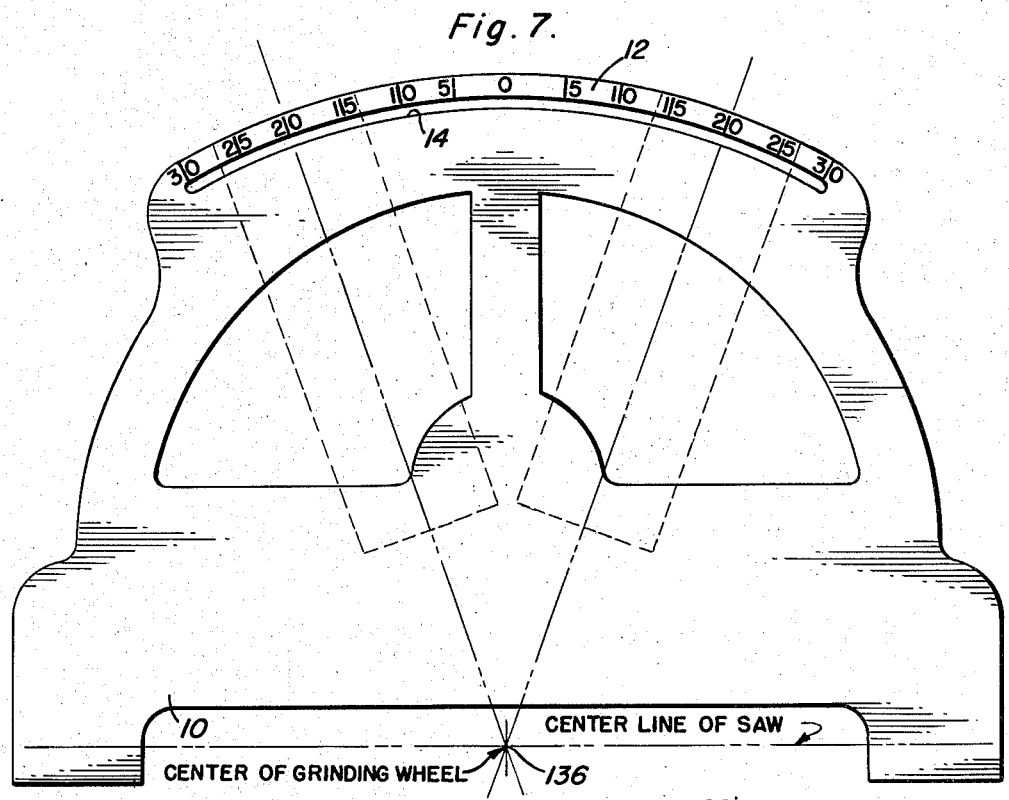
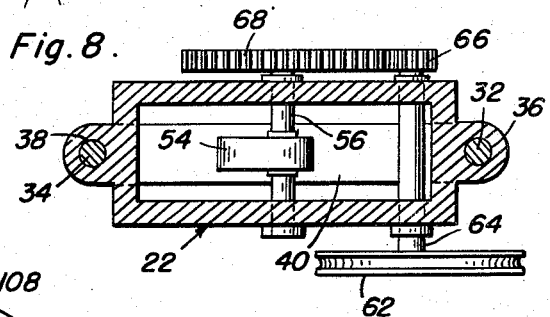
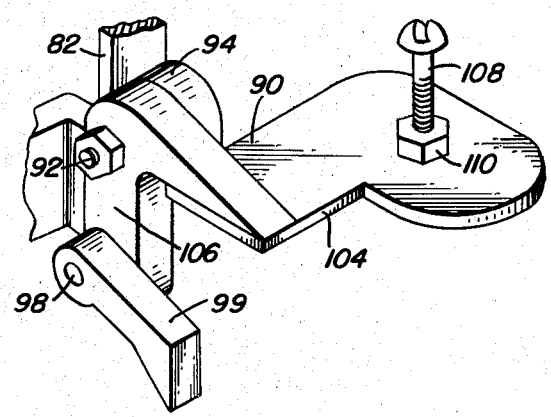
Edward J. Duquette
INVENTOR.

Patented Aug. 22, 1950

2,519,748

UNITED STATES PATENT OFFICE 2,519,748

AUTOMATIC SAW SHARPENING MACHINE

Edward J. Duquette, Sommersworth, N. H.

Application September 26, 1949, Serial No. 117,879

2 Claims. (Cl. 76—41)

This invention relates to novel and useful improvements in saw sharpeners.

An object of this invention is to sharpen a saw or other work piece by a grinder which is carried by a pivotal assembly, the grinder being lifted from one tooth to the other of the saw; the pivotal feature being employed for the purpose of obtaining adjustment with respect to the saw teeth, the saw being moved in stages or short distances after each tooth is ground.

Another object of this invention is to improve the means of moving the saw supporting carriage in a horizontal plane the short distances, which improved means consists of a bracket which is mounted on a support for pivotal movement, the bracket being engaged by a reciprocating element which causes the bracket to be pivoted whereby the dog which is carried by the bracket causes movement of the carriage in response to each pivotal operation of the bracket.

A further object of this invention is to improve saw sharpeners by fabricating an inexpensive yet satisfactorily operative apparatus, which employs a new movement in so far as saw sharpeners are concerned, namely the reciprocating element together with the bracket and dog assembly for operating the carriage.

Ancillary objects and features will become apparent in following the illustrated form of the invention.

In the drawings:

Figure 4 is an elevational side view of the device shown in Figure 1;

Figure 5 is a sectional view taken approximately on the line 5—5 of Figure 1 and in the direction of the arrows;

Figure 6 is a view taken substantially on the line 6—6 of Figure 5 and in the direction of the arrows, portions being broken away to illustrate detail of construction;

Figure 7 is a view of the base showing center lines schematically, the center lines being of the saw and plane passed through the grinding wheel;

Figure 8 is a sectional view taken substantially on the line 8—8 of Figure 5 and in the direction of the arrows, and;

Figure 9 is a perspective view of a bracket and dog which constitutes an important part of the invention.

Figure 1:
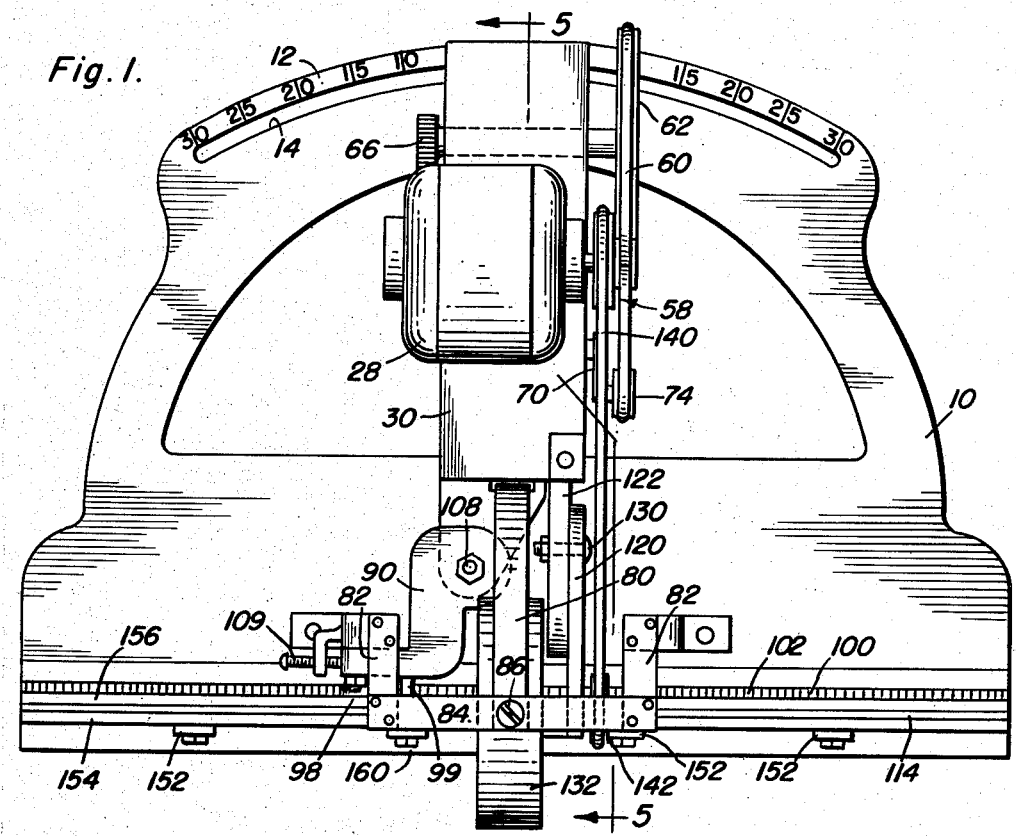
Figure 1 is a plan view of the device.
Figure 2:
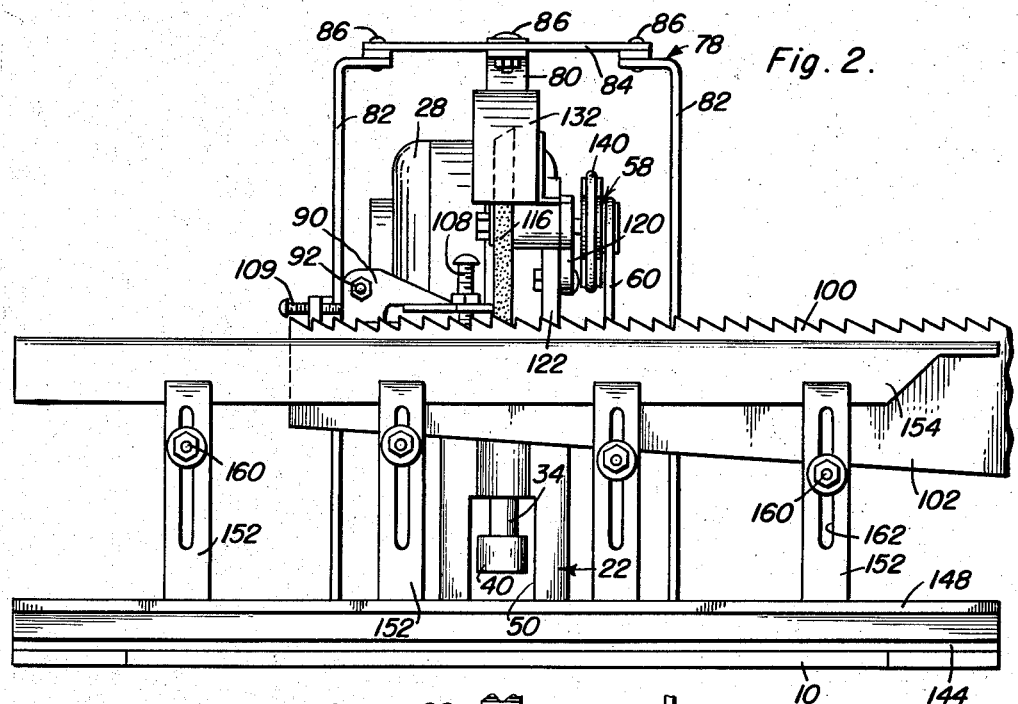
Figure 2 is a front view of the device shown in Figure 1.
Figure 3:
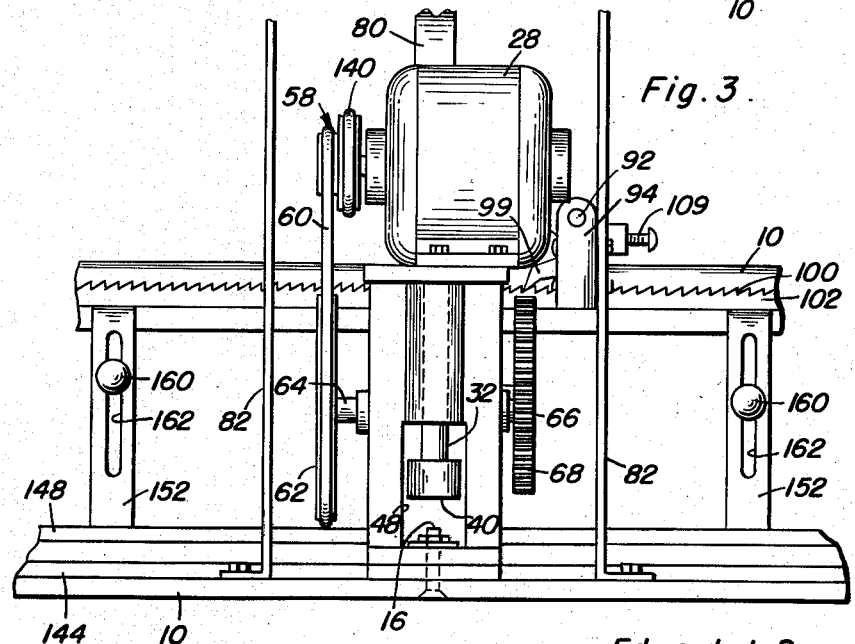
Figure 3 is a rear view of the device shown in Figure 1.

In the instant invention, a base 10 is employed having indicia 12 struck on an arc on a strip which is secured to the base. This base forms a holder for the operative elements of the device. Disposed adjacent the indicia 12 is a slot 14 which accommodates a screw 16 having a nut 18 thereon. This screw passes through a bottom plate 20 which constitutes a part of the housing generally indicated at 22 and the nut rests on a washer which seats on the plate 20. By tightening the nut 18, the housing 22 may be locked in selected positions, which positions are indicated by the indicia 12.

The front end of the housing 22 and specifically, the front end of the plate 20 has a spacer strip 26 disposed thereon to elevate the front of the housing an amount equal to the elevation caused by the strip 13.

A motor 28 is disposed on the reciprocating plate or element 30 which has a pair of guide rods 32 and 34 respectively extending from the lower surface thereof. The guide rods pass through passages 36 and 38 which are formed in the ends of the housing 22. A connecting bar 40 is secured to the lower ends of the guide rods 32 and 34 adapted to abut the stops 44 and 46 formed by the upper end of the notches 48 and 50 in the ends of the housing. From inspection of Figure 5 the disposition of the connecting bar 40 is manifest that is, it extends through the housing longitudinally thereof and projects through the notches 48 and 50.

Since the motor 28 is disposed on the element 50, the motor reciprocates therewith. A cam follower 52 is fixed to the undersurface of the element 30 and engages the cam 54 which is fixed to the shaft 56.

The motor 28 (see Figure 4) has a double sheave or pulley 58 secured to the shaft thereof. One of the pulleys has a belt 60 entrained therearound, which is also entrained around the pulley 62. This pulley is fixed to the shaft 64 which passes entirely through the housing 22 and has a gear 66 fixed thereto. This gear is the smaller of two and is accordingly a pinion since it is meshed with a larger gear 68. The larger gear 68 is secured to the shaft 56 to obtain the proper drive connection.

As the motor 28 operates, the pulley 62 is also operated thereby causing the gear train to be actuated for the purpose of operating the cam 54 which reciprocates the element 30.

Since the motor 28 reciprocates with the element 30, an adjustable belt tightener is supplied. This belt tightener consists of an arm 70 which is pivoted as at 72 to one side of the housing and which has an idler pulley 74 carried thereby. The belt 68 is entrained around the idler pulley. A spring 76 opposing the pivotal operation of the arm 70 and constantly pressing it in a direction so as to cause the idler 74 to tighten the belt, is attached to the housing and to the arm 70.

A support generally indicated at 78 is secured to the housing 22 and to the base by means of the pair of legs 82 and leg 80. A connecting member 84 is secured to the outer ends of each leg of the pair 82 and also to the leg 80. The screw 86 and rivets are employed for this purpose. The screw 86 being passed through the member 84 and the leg 80, forms a vertical pivot for the housing 22 on the base 10.

One of the other purposes of the support is to carry the bracket seen in Figure 9 for pivotal movement. An aperture in the bracket 90 accommodates the pivot pin 92 which is secured to a block 94 for pivotal movement. A spacer (Figure 5) 96 is secured to a pivot pin 98 which is carried by the bracket 90. The pivot pin 98 mounts the dog 99 which is adapted to engage in the teeth 100 of the rack 102.

The shape of the bracket 90 is of importance. There is a flat plate portion 104 with an offset 106 rising from one surface thereof. This offset is substantially L-shaped with the aperture 88 being at the junction of the legs. At the lower end of one of the legs, there is a suitable hole provided for accommodation of the pivot pin 98. A set screw 108 with a locking nut 110 thereon is carried by the flat plate portion 104 and is adapted to engage the upper surface of the element 30 or more specifically, an extension 112 thereof (Figure 5).

In operation of this portion of the structure, when the element 30 is reciprocated, it strikes the set screw 108 which is used to define the limit of travel of the bracket. By so striking the set screw 108, the bracket 90 is pivoted about the pin 92 as an axis until striking the stop screw 109. This movement is reflected in the displacement of the pivot pin 98 in an arcuate path. Since the center of pivotal movement of the dog 99 is bodily displaced in the arcuate path, the dog being in mesh in the teeth 100 causes the rack 102 to be moved. Each time the element 30 reciprocates, this operation takes place on the lifting part of the cycle thereof. During the lowering part of the cycle, the dog 99 slips to another tooth of the rack 102.

It is necessary that the teeth of the saw 114, which exemplifies a typical workpiece, be sharpened or in some way treated during this cycle of operation of the element 30. Accordingly, a cutter, as the grinder 116, is mounted on an axle 118 which is disposed in the arm 120. The arm 120 is carried by the supporting member or bracket 122 which is in turn fixed to the reciprocating element 30. A pivot pin 124 is employed for holding the arm 120 on the support member 122. A slot 126 is provided in the arm 120 and a curved slot 128 is formed in the element 122. A screw 130 is passed through both of the slots which are intersecting, whereby pivotal adjustment of the arm 120 may be obtained by simply loosening the screw 130 and tightening it after the arm 120 has been moved to the desired position. This raises or lowers the grinder 116 which is protected by the guard 132 carried by the supporting element 122.

Accordingly, when the element 30 is reciprocated, the cutter is also reciprocated so that its edge is in working or operative condition as shown at 136 in Figure 7, that is always over the center line of the saw.

In order to operate the grinder, a belt 140 is entrained around the pulley 142 which is fixed to the axle 18, and also around a part of the double sheave 58. The motor 28 causes actuation of the grinder 116 in this manner.

Means for supporting a carriage holding the saw 114 is provided. This means consists of a rail 144 having dovetail connection 146 with a runner 148. This runner forms a part of a carriage for supporting the saw 114. A clamp is arranged with the runner 148 for holding the saw 114 in selected vertically adjustable positions. This clamp includes a number of pairs of vertically rising or upstanding arms 152 having front and back plates 154 and 156 respectively carried at the upper ends thereof. Bolts 160 pass through the slots 162 formed in the pairs of arms 152 and have nuts thereon for pulling each arm of the pairs together to clamp the clamp plates 154 and 156 against the saw 114. The screws 160 act as the lower limit for the saw or the base therefor.

The rack 102 is fixed to the plate 156 so as to cause sliding operation of the runner 148 on the rail 144 in the manner previously described.

Having described the invention, what is claimed as new is:

1. A saw sharpener comprising a base, a housing pivoted to said base, a plate disposed on said housing, and means for guiding said plate in a reciprocatory travel, a motor, means secured to said plate and operatively connected with said motor for reciprocating said plate when said motor is operative, a saw clamp, a rail secured to said base, a carriage disposed on said rail carrying said clamp, a support disposed on said base, a bracket pivoted to said support and a dog carried by said bracket, a member having teeth secured to said carriage with said dog disposed in meshing relationship with the teeth, said bracket being disposed over said plate, an adjusting contact member operatively connected with said bracket and said plate to transfer preselected amounts of reciprocatory movement of said plate to pivotal movement of said dog whereby the amount of movement of the carriage is regulated, a cutter carried adjustably by said plate to engage the teeth of the saw during a part of each reciprocatory cycle of said plate.

2. A saw sharpener comprising a base, a housing pivoted to said base, a plate disposed on said housing, and means for guiding said plate in a reciprocatory travel, a motor, means secured to said plate and operatively connected with said motor for reciprocating said plate when said motor is operative, a saw clamp, a rail secured to said base, a carriage disposed on said rail carrying said clamp, a support disposed on said base, a bracket pivoted to said support and a dog carried by said bracket, a member having teeth secured to said carriage with said dog disposed in meshing relationship with the teeth, said bracket being disposed over said plate, an adjusting contact member operatively connected with said bracket and said plate to transfer preselected amounts of reciprocatory movement of said plate to pivotal movement of said dog whereby the amount of movement of the carriage is regulated, a cutter carried adjustably by said plate to engage the teeth of the saw during a part of each reciprocatory cycle of said plate, and means drivingly connecting said motor and said cutter.

EDWARD J. DUQUETTE.

REFERENCES CITED

The following references are of record in the file of this patent:

UNITED STATES PATENTS

| Number | Name | Date |
|---|---|---|
| 180,115 | Covel | July 25, 1876 |
| 472,865 | Drake | Apr. 12, 1892 |
| 519,893 | Newton | May 15, 1894 |
| 1,846,331 | Hickey | Feb. 23, 1932 |

FOREIGN PATENTS

| Number | Country | Date |
|---|---|---|
| 178,295 | Switzerland | July 15, 1935 |